US012361817B2

(12) United States Patent
McNutt et al.

(10) Patent No.: US 12,361,817 B2
(45) **Date of Patent: *Jul. 15, 2025**

(54) APPARATUS, SYSTEM AND METHODS FOR PROVIDING NOTIFICATIONS AND DYNAMIC SECURITY INFORMATION DURING AN EMERGENCY CRISIS

(71) Applicant: BluePoint Alert Solutions, LLC, Elgin, IL (US)

(72) Inventors: John McNutt, Elgin, IL (US); Ken Volkening, Hampshire, IL (US); John Shales, Elgin, IL (US); Todd Stirn, Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,582

(22) Filed: Jul. 17, 2023

(65) Prior Publication Data

US 2023/0386318 A1 Nov. 30, 2023

Related U.S. Application Data

(63) Continuation of application No. 17/328,738, filed on May 24, 2021, now Pat. No. 11,710,395, which is a (Continued)

(51) Int. Cl.
*G08B 21/00* (2006.01)
*G08B 3/10* (2006.01)
(Continued)

(52) U.S. Cl.
CPC ............... *G08B 25/12* (2013.01); *G08B 3/10* (2013.01); *G08B 5/36* (2013.01); *G08B 7/06* (2013.01);
(Continued)

(58) Field of Classification Search
CPC . G08B 25/12; G08B 3/10; G08B 5/36; G08B 7/06; G08B 19/005; G08B 21/02; G08B 25/08
(Continued)

(56) References Cited

U.S. PATENT DOCUMENTS 5,650,770 A 7/1997 Schlager
6,052,052 A 4/2000 Delmonaco
(Continued)

*Primary Examiner* — Tai T Nguyen
(74) *Attorney, Agent, or Firm* — Patzik, Frank & Samotny Ltd

(57) ABSTRACT

The present invention provides a system and methods for notifying first responders of the general or specific location of a security crisis or threat in a building or public location, and the type of threat or crisis that has occurred, while notifying building occupants or others in the public location of the crisis and how to respond. The crisis management and notification system provides critical information to the first responders, including initial location of the crisis and whether the crisis location has changed in real time, audio and video input of the crisis arena, communications with designated occupants in the crisis arena, static building or location information, and other information. The crisis notification system can be scaled to allow the effective use in facilities of differing sizes and layouts. The system is also flexible, enabling the system to integrate with currently existing systems or to operate with new devices.

20 Claims, 11 Drawing Sheets

Related U.S. Application Data continuation of application No. 16/663,462, filed on Oct. 25, 2019, now Pat. No. 11,017,658, which is a continuation of application No. 16/164,061, filed on Oct. 18, 2018, now Pat. No. 10,497,251, which is a continuation-in-part of application No. 15/365,322, filed on Nov. 30, 2016, now abandoned, which is a continuation of application No. 14/864,377, filed on Sep. 24, 2015, now Pat. No. 9,514,633, which is a continuation-in-part of application No. 14/331,875, filed on Jul. 15, 2014, now Pat. No. 9,251,695.

(60) Provisional application No. 61/846,359, filed on Jul. 15, 2013.

(51) Int. Cl.

| | |
|---|---|
| ***G08B 5/36*** | (2006.01) |
| ***G08B 7/06*** | (2006.01) |
| ***G08B 19/00*** | (2006.01) |
| ***G08B 21/02*** | (2006.01) |
| ***G08B 25/08*** | (2006.01) |
| ***G08B 25/12*** | (2006.01) |

(52) U.S. Cl.
CPC .......... *G08B 19/005* (2013.01); *G08B 21/02* (2013.01); *G08B 25/08* (2013.01)

(58) Field of Classification Search
USPC .................................................. 340/540, 541
See application file for complete search history.

(56) References Cited

U.S. PATENT DOCUMENTS

| | | | | |
|---|---|---|---|---|
| 6,175,308 | B1 | 1/2001 | Tallman | |
| 6,400,265 | B1 | 6/2002 | Saylor | |
| 6,459,371 | B1 | 10/2002 | Pike | |
| 6,462,654 | B1 | 10/2002 | Sandelman et al. | |
| 6,658,091 | B1 | 12/2003 | Naidoo et al. | |
| 6,897,774 | B2 | 5/2005 | Costa et al. | |
| 6,958,689 | B2 | 10/2005 | Anderson et al. | |
| 6,970,183 | B1 * | 11/2005 | Monroe | G08B 7/062 348/E7.086 |
| 7,113,090 | B1 | 9/2006 | Saylor | |
| 7,113,099 | B2 | 9/2006 | Tyroler et al. | |
| 7,323,979 | B2 | 1/2008 | Eskildsen | |
| 7,518,500 | B2 | 4/2009 | Aninye | |
| 8,274,563 | B1 | 9/2012 | Bunch | |
| 8,310,365 | B2 | 11/2012 | Siegler et al. | |
| 8,314,680 | B2 | 11/2012 | Ichihara | |
| 8,412,147 | B2 | 4/2013 | Hunter | |
| 8,489,113 | B2 | 7/2013 | Walter | |
| 8,797,210 | B2 | 8/2014 | Derrick | |
| 8,935,052 | B2 | 1/2015 | Hermann | |
| 2002/0003470 | A1 | 1/2002 | Auerbach | |
| 2004/0056765 | A1 | 3/2004 | Anderson et al. | |
| 2004/0066282 | A1 | 4/2004 | Costa | |
| 2004/0222884 | A1 | 11/2004 | Costa et al. | |
| 2005/0264413 | A1 | 12/2005 | Eskildsen | |
| 2008/0061962 | A1 | 3/2008 | Campman | |
| 2008/0180243 | A1 * | 7/2008 | Aaron | G08B 23/00 455/404.2 |
| 2009/0224966 | A1 | 9/2009 | Boling | |
| 2009/0322853 | A1 | 12/2009 | Katz | |
| 2011/0169633 | A1 * | 7/2011 | Lauder | G01S 5/18 340/539.13 |
| 2012/0157037 | A1 | 6/2012 | Hoffman | |
| 2014/0266678 | A1 | 9/2014 | Shapiro | |
| 2014/0266700 | A1 | 9/2014 | Reske | |
| 2015/0204109 | A1 | 7/2015 | Ergenbright | |
| 2016/0105644 | A1 * | 4/2016 | Smith | G08B 13/19667 348/159 |
| 2016/0232744 | A1 | 8/2016 | Sjoberg | |
| 2017/0238129 | A1 * | 8/2017 | Maier | H04W 4/14 455/404.2 |
| 2018/0364654 | A1 | 12/2018 | Locke | |
| 2019/0035242 | A1 | 1/2019 | Vazirani | |
| 2019/0130723 | A1 | 5/2019 | Thiel | |

* cited by examiner

APPARATUS, SYSTEM AND METHODS FOR PROVIDING NOTIFICATIONS AND DYNAMIC SECURITY INFORMATION DURING AN EMERGENCY CRISIS

This present application is a continuation of and claims priority to U.S. patent application Ser. No. 17/328,738, filed May 24, 2021, now U.S. Pat. No. 11,710,395, which is a continuation of U.S. patent application Ser. No. 16/663,462, filed Oct. 25, 2019, now U.S. Pat. No. 11,017,658, which is a continuation of U.S. patent application Ser. No. 16/164,061 filed Oct. 18, 2018, now U.S. Pat. No. 10,497,251, which is a continuation-in-part of U.S. patent application Ser. No. 15/365,322 filed Nov. 30, 2016, now abandoned, which is a continuation of U.S. patent application Ser. No. 14/864,377 filed Sep. 24, 2015 now U.S. Pat. No. 9,514,633, which is a continuation-in-part of U.S. patent application Ser. No. 14/331,875 filed Jul. 15, 2014, now U.S. Pat. No. 9,251,695, which claims priority from U.S. Provisional Patent Application Ser. No. 61/846,359 filed Jul. 15, 2013, all of the foregoing are incorporated by reference herein.

FIELD OF THE INVENTION

The present disclosure relates to a command and control rapid emergency response system and structure, and in particular, the present disclosure relates to a smart incident management and notification system and manual and smart devices for determining an incident or emergency crisis, and managing the crisis by obtaining and providing robust, dynamic information, including the particular location of the crisis in a building or public location. Additionally, the incident management and notification system includes a computer program or app that can be used in conjunction with the crisis management system to activate the system or to receive alerts that the system has been activated. The app can be used by those in a command group, a building leadership response group, or by others to provide a quick response, when necessary, and to also provide feedback if the system was inadvertently activated.

The command and control incident management and notification system or crisis management system provides the crisis information to first responders, such as police, security, fire or medical emergency personnel, along with managing selected data notifications to building or location occupants and to a command group or building leadership response group, among others, as necessary. Although not first responders, the command group or building leadership response group is a predetermined group of individuals that may have expert knowledge of the particular building and safety measures, and have a need to know when an incident or emergency crisis has been detected.

The present disclosure further relates to a smart incident management and notification system and the system devices, that can manage a crisis or an emergency incident, such as a security, fire or medical emergency, and obtain dynamic crisis information, utilizing artificial intelligence as necessary, along with a notification system and related methods, all for providing fast, reliable, accurate and dynamic crisis information, such as the particular location of the crisis. The dynamic crisis information can be transmitted or communicated in real time audio and/or video, along with building or public space details, to first responders, the command or building leadership response group, while also notifying building occupants and individuals within the vicinity, of the crisis.

The present disclosure further relates to a true 24 hour, seven days a week, life safety solution for security, fire or medical threats by disclosing an emergency alarm system that utilizes smart components supervising themselves for working conditions, including battery life, proper battery backup, device disablement, tampering, certification, etc. Additionally, the smart devices utilized by the threat alarm system, provide artificial intelligence gathering of information, as necessary, along with redundant communications to prevent most cases of tampering with the system, or attempts to shut down the system.

The present disclosure further relates to a command and control incident management and notification system that can be integrated into existing first responder systems or be utilized as a stand-alone system, in which the provided information is easily accessible, intuitively organized, verified and updates the first responders and others about the crisis in real-time, thereby improving the response in both time and resources. The present disclosure further incorporates subscribers, such as students, building occupants, and others, such as a building leadership response group into the management and notification system to provide additional dynamic information through artificial intelligence capabilities, once an alarm is activated. Additionally, based on the situation, subscribers may receive instructions during an activation, for example through the subscriber's smart phone, pertaining to safety strategies, including staying in place, fleeing, among others, and if fleeing, instructions on the optimal path to reduce injury.

BACKGROUND OF THE INVENTION

There are a number of events that can occur in public and private buildings that rise to the level of an emergency crisis for which first responders, such as police officers, fire fighters and medical personnel, must be called on for assistance. These events can include armed intruders, burglary, acts of terrorism, fire, and injuries from one or more of these events or unrelated events. Often times, the damage and harm from these crisis events can be minimized or eliminated if first responders, individuals near the location of the crisis, and others are notified quickly, provided specific dynamic information, and, depending on the particular type of event, allowed to respond in accordance with their abilities.

As an example, in certain situations, such as a school, with sufficient information, individuals near the crisis may be allowed to exit the arena to avoid harm, while first responders may be notified of the existence of the crisis earlier and be able to take quick action to minimize the damage. The earlier first responders and those located near the crisis arena know of the crisis, the better chance that less damage and injury will occur.

An example of a notification system is a building fire alarm notification system, which is capable of notifying first responders or fire fighters and building occupants of the existence of a fire. These systems are well known and have been employed for many years at public and private locations, such as schools, libraries, hospitals, shopping malls, etc.

In general, fire alarm notification systems are utilized in large public or commercial buildings in which a significant number of individuals or occupants may be located at any given time. The typical fire alarm notification system provides for some or all of the following functions: detecting a fire (or providing individuals with the chance to notify others of the existence of a fire), notifying nearby occupants of the presence of a fire, notifying the fire department and other emergency personnel, and in some cases, operating certain fire safety functions, such as closing fire retardant doors, setting off the sprinkler system, etc.

Fire alarm notification systems often incorporate detection measures or devices to detect a fire, such as fire and smoke detectors. Additionally, manual fire alarm pull boxes may be placed at strategic locations around a building so that individuals can use the manual boxes, which may commence the notification process earlier than if the notification process was started using the automated fire and smoke detectors. The fire alarm notification systems are usually wired throughout a building so that whether a manual pull box is engaged, or a smoke detector detects smoke and sets off an alarm, occupants throughout the building are notified, fire safety functions can be initiated and the fire department can be automatically notified, usually through an approved central station dispatch or monitor.

To warn building occupants, for example, a siren or sound loud enough to indicate the presence of a fire hazard can be sounded throughout the building along with instructions to direct emergency evacuation. In this instance, the alarm sounds and building occupants understand that they must leave the building immediately, or move to a particular pre-approved location. Visual indicators of the fire emergency may also be employed in combination with the sound producing fire-warning devices. The most common devices employed include horns, bells, sirens, stroboscopic lights, and speakers.

Some private locations, such as homes and businesses incorporate fire alarm notification systems, security alarms and medical emergency notification systems, which likewise, attempt to prevent a security crisis or indicate that a security or medical emergency crisis has occurred, such as burglaries, unauthorized intrusions or other illegal activities. These security systems utilize cameras and sensors to determine if an intrusion has occurred and then send a signal that an intrusion has occurred. Many of these systems also allow the owner of the home or business (or at least the owner of the security system) to view the arena remotely and determine if a crisis has occurred or is occurring.

However, buildings and public locations that may be tens or hundreds of thousands of square feet in size, and may contain hundreds or thousands of occupants, need a more robust and dynamic security crisis notification system, for notifying occupants or individuals located at or near the vicinity of the security crisis or medical emergency. This is especially true for acts of terrorism or armed intruders, such as those that have occurred over the years at public schools and other public locations.

A first responder notification system used for acts of terrorism is needed to provide individuals at or near the emergency crisis arena an increased ability to quickly notify first responders (and any other predetermined groups of individuals) of the security crisis, including the general or specific location of the crisis, while also quickly notifying those at or near the vicinity of the ongoing crisis. Needed is an intelligent or smart command and control management and notification system that utilizes smart devices for providing robust dynamic information such as the precise location of the security crisis to first responders, along with providing selected data notifications to those at or near the crisis. Along those lines, there is a need for smart devices that can determine and provide particularized dynamic information using preloaded location information, artificial intelligence as necessary, along with the notification system, with the intent of providing fast, reliable information to first responders and occupants within the crisis vicinity.

There is also a need for a true life safety system that is available 24 hours a day, seven days a week, that monitors security, fire and/or medical threats incorporating smart components that supervise themselves or can be supervised remotely, for working conditions, including checking battery life and utilizing battery backup, watching for device disablement and tampering, along with other activities that might incapacitate the system. There is a need for smart devices in the threat alarm system that provide information gathering, along with redundancies, such as redundant communications, to prevent inaccurate information and attempts at tampering with the system.

There is further a need for a system that over time and because of the similarities to existing notification systems, building occupants and others could understand how the crisis system operates and be able to utilize the smart notification devices, for example smart phones, to properly be notified and to manually or automatically notify first responders and others of the ongoing crisis.

Further, since the response of individuals in a crisis area is different for a police emergency, a fire emergency and for a medical emergency, a system is needed that can address one or more of the different emergencies that arise separately or combined during a crisis. As such, there currently exists a need for a command and control crisis notification system, include dynamic smart devices, along with methods that minimizes the time from the inception of the crisis until providing notification and particular dynamic crisis data to the first responders, command groups and others, such as those in or near the emergency crisis. Such a crisis notification system will allow for faster reaction time by the first responders, and by others that may be attempting to escape the crisis arena, thereby reducing or eliminating the damage and harm to those in the vicinity of the crisis.

Additionally, there is a need for quick notification and the transmission of dynamic particular crisis information, including the general or specific location of the crisis, to the first responders and emergency authorities, along with notification and instructions to those in the vicinity of the crisis to reduce injury and death during a security crisis event. The present disclosure addresses the current shortcomings in the security crisis area.

SUMMARY OF THE INVENTION

The present disclosure is a novel rapid emergency response system for command and control structure, including a smart incident management and notification system along with smart devices for determining an incident, an emergency or a crisis, and discloses management of the crisis by obtaining and transmitting or providing robust, static and dynamic information to first responders, such as security, fire or medical emergency personnel, along with managing selected data notifications to building occupants and others, as necessary.

It is therefore an objective of the present disclosure to provide a smart location identifiable crisis management system, which can obtain crucial information about an ongoing emergency crisis, and notify and inform first responders where the crisis was initiated, and to where the crisis has moved. The smart incident management and notification system is configured to also provide additional related information from databases such as building or area layout, power grids, entrance and exit doors, along with real-time video and audio from smart devices in the crisis arena, either from static smart devices or from subscriber devices previously registered and activated for the crisis. The information provided to the first responders will assist in a quick response to the security crisis or threat.

It is an objective of the present disclosure to provide apparatus or devices, systems and methods for notifying first responders or those that provide emergency services, along with building occupants or other individuals in, at or near a crisis. The present disclosure includes static smart devices utilizing manual smart actuation devices, buffering cameras, microphones, strobe lights, etc., that can determine and verify the general or specific location of the crisis and/or if the emergency or crisis is dynamically moving from one area to a different area of the crisis arena. For example, the incident management and notification system can determine if an attacker was originally in a particular building in one location, based on activation of a device and cameras and microphones in that smart actuation device, and if that attacker had moved to a different location in the building based on other smart devices and/or other activated devices. The initial location information is important, but the new location information may be more important. Additionally, artificial intelligence may utilize the transmitted dynamic information, along with static building information, to determine a strategy for first responders, and different strategies (flee or remain in place) for those building occupants that may be located in the building near the crisis.

It is also an objective of the present disclosure is to use the smart devices to provide initial notification to the first responders along with important dynamic crisis information, that can assist the first responders in the identification of the location in a building or facility, where the crisis or multiple crises have initially occurred and/or to where a crisis has moved, in real time. In certain situations, the crisis management system is initiated manually through the actuation of a smart actuation device, while in other situations, the crisis management system is activated for example through other detection devices, such as gunshot or broken glass detection software and other devices. Accordingly, the present disclosure provides for these smart devices to determine and provide particularized dynamic information, utilizing artificial intelligence as necessary, along with a notification system and methods, for fast, reliable and dynamic information, such as the particular location of a crisis in a building or public space, relating to a security crisis, a fire crisis, and/or a medical crisis, and including audio, video and building or public space details, to first responders, while also notifying building occupants and individuals within the vicinity and others, as necessary of the crisis. Smart devices can utilize a buffering system to keep audio and visual records of events just prior to an activation for assisting in determining an actual crisis.

Additionally, it is an objective of the present disclosure to incorporate artificial intelligence systems as a dual-stage verification to determine if the inputs to the crisis management system are those of an actual crisis or not. Further, in the event of an actual crisis, an artificial intelligence system can be utilized to create a lockdown of an area where perpetrators may be located, while automatically unlocking other doors and/or windows to allow building occupants to escape, while informing first responders that those leaving the building at those sites are not the perpetrators, thereby reducing the chance of occupants being accidentally injured.

It is yet another objective of the present disclosure to provide a true 24 hour, seven days a week, life safety solution for security, fire or medical emergency threats through the security alarm system that additionally utilize smart components or devices that self-test or supervise themselves or are capable of being supervised remotely. These self-tests ensure that the devices are in working condition; that their battery is sufficient to carry out the device functions, that there is proper battery backup, that device disablement and/or tampering is detected and prevented, among other functions. It is additionally an objective that the devices include various redundancies, including redundant communications to prevent cases of tampering with the system, or attempts to shut down the system, and that the devices communicate through the system when they are not operating at optimal capacity. Redundant communications further ensure that the message gets through even if one method of communications fails.

It is a further objective of the present disclosure to provide an incident management and notification system or crisis management system for security, fire or medical emergency threats in which the system or smart devices are capable of tracking building occupants or subscribers through smart phones, after a subscriber registers or otherwise provides permission, so that upon actual crisis activation, and during the crisis the location of building occupants can be determined and those subscribers notified of the crisis as necessary. Additionally, location of multiple building occupants and their collective movement can be used to determine the situation in the arena, such as groups of people moving, hiding, being held hostage, etc. Using artificial intelligence along with input about the building layout, possible location of emergency, and other situational awareness, subscribers can be provided recommendations for exiting the arena (including explicit instructions for doing so), for remaining in their current location, etc. Additionally, subscribers or occupants may have real time access through their smart phones and the crisis management system to first responders to provide dynamic information pertaining to the crisis, or to be informed as to steps to take to reduce harm or injury and exit the arena.

It is a further objective of the present disclosure to provide a security alarm or crisis management system for security, fire or medical emergency threats in which the system or smart devices are capable of gathering information at or near the scene of the crisis, using smart devices, cameras and microphones, and utilizing artificial intelligence algorithms to identify assailant and track assailant's movement as the crisis occurs in real time. Along those lines, noise levels at particular locations (near a pull station, etc.) can be used to highlight areas of chaos or gunshots to track likely areas of conflict. These areas can be superimposed over building layouts to assist first responders in determining actions to be taken to reduce injury and harm to others.

It is another objective of the present disclosure to provide a security alarm or crisis management system for security, fire or medical emergency threats in which the system or smart devices are capable of recording video, pictures and sound and time stamping that information to be used for investigative purposes.

The crisis management and notification system is scalable, and the scalability of the notification system or crisis management system allows for effect use in different size facilities and public spaces regardless of the design or layout. The incident management and notification system is also flexible, using smart devices, manually operated pendants or manually operated fixed smart actuation devices or buttons, or a combination of these devices, along with input from building occupants or subscribers (that have previously registered or provided permission), enabling the alarm system to be integrated with currently existing systems, such as existing fire alarm systems or backbones, or to be configured to operate separately with new devices, such as smart alarm actuation devices and transmitters, as described herein. Additionally, a computer program, computer application or app can be utilized by the system (and those with access to the app) as an input device to initiate or activate the system or to receive alerts of an activation.

In an embodiment, a novel smart alarm pull is utilized in conjunction with the crisis management and notification system described herein. The novel smart alarm pull includes a pull device similar in size and shape to existing pull devices that allow an individual to set off a fire alarm, for example. However, the novel pull device is configured to be either battery operated or connected to building power, with backup battery power. The novel pull device further comprises a reset switch for resetting the device after it has been pulled or actuated, either in a real emergency, a test run or inadvertently. The novel pull device further comprises a tamper switch that provides for protection if someone attempts to tamper with the device. The novel pull device is also configured to be connected to the Internet or a Virtual Private Network (VPN), through a communications protocol, such as Wi-Fi, Bluetooth, ZigBee, or any other communication protocol that can be incorporated with a secure connection.

It is a further objective of the present disclosure to provide in the smart alarm activation device embodiments, video cameras, microphones, strobe lights, PA speakers and other information gathering and notification devices, set up or located in the facility that can be incorporated into the crisis notification system as smart devices as described herein. These smart alarm pulls or smart devices, as disclosed herein, can be activated automatically (i.e., gun shots, broken glass, smoke, fire) or manually (i.e., smart actuation devices, computer app, 911 calls) to provide notification and dynamic crisis arena information to first responders and to building occupants, as necessary.

Again, the present disclosure provides for crisis arena dynamic information combined with static building information (i.e., floor plans, utilities and power layouts) to create a complete and accurate real time picture for the first responders arriving on the scene. The crisis arena information can be provided to the first responders at a central dispatch, at mobile locations, such as squad cars and emergency vehicles and even to individual mobile devices, such as cell phones, laptops and tablets, for example. Additionally, and as described herein, individuals in the crisis arena (subscribers and others) will be able to transmit audio and/or video to the first responders, either directly or indirectly using the crisis management and notification system. The individuals in the crisis arena that can communicate with first responders can be a previously designated group (subscribers) and the communication may be through text, electronic mail or voice, manually or automatically, among others. Further, the crisis notification system can be configured to provide follow up instructions to those in the crisis arena and/or to the first responders as they respond to the crisis.

By using existing alarm systems, such as fire alarm notification systems, public address (PA) systems, etc., the present notification system does not need to utilize its own communication backbone or standalone security crisis alarm transmission devices. However, a separate crisis management system can be implemented alongside an existing fire alarm system or in a location in which no fire alarm system exists, to create a more robust crisis notification system. Additionally, existing power lines can be used for communications or signals and to connect smart devices, additional cameras, speakers, microphones, etc., and even the system as a whole.

In an embodiment, multiple smart actuator devices can be used for each different type of crisis: security, fire and medical. For example, instead of a single red fire pull on a wall in a school, there may be three or more pulls, including novel intelligent pulls, for different crises. The pulls can be color coded so that a different pull can be actuated for each different crisis, with a red pull for a fire crisis, a blue pull for a security crisis and a green pull for a medical crisis. Each of these different pulls will set into motion different procedures for alerting the proper local authorities and for providing different notifications to individuals in or near the arena depending on the crisis.

As an example, if the red pull is actuated for a fire, the notification would be to exit the building, using a combination of strobes, sirens and verbal instructions, while the fire department was notified and provided information about the building and where the pull was actuated (and ostensibly where the fire started) and when. However, if a blue pull is actuated, there may be instruction to lock all doors in one area, while instructing those in a different area to exit the building, while the local police and SWAT teams are notified and provided with information about the crisis. Clearly, different pulls will provide for different notifications and instructions.

Other objects and advantages of the present disclosure will become apparent to one having ordinary skill in the art after reading the specification in light of the drawing figures, however, the spirit and scope of the present disclosure should not be limited to the description of the embodiments contained herein.

BRIEF DESCRIPTION OF THE DRAWINGS

The preferred and alternative embodiments of the invention will be described in conjunction with the appended drawings, which illustrate and do not limit the scope of the invention, where like designations denote like elements, and in which.

DETAILED DESCRIPTION OF THE INVENTION

The present invention provides a system, devices and methods for determining and verifying an emergency incident, and managing and providing notification to first responders, emergency service personnel or building leadership, of the emergency, crisis or potential crisis. In doing so, point-identifiable security crisis alarm signals, from smart devices located in the crisis arena, or stationary pulls, buttons or wearable pendants, capable of indicating a general or specific location in a building or facility, are provided to the first responders for their immediate response to the threat. Further, depending on the specifications of the crisis notification system, along with the location of the crisis (including where the crisis alarm was first reported), information about the crisis can be transmitted to the first responders. The crisis information may include where the crisis has moved to (dynamic location), audio or video of the crisis arena, along with specific information about the building layout and utilities, all in real time. The system also is configured to provide all types of communications with certain designated individuals, including individuals predetermined to have a need to know about the crisis (command group or building leadership response group), and those individual that may be in the crisis arena at the time of the crisis, in order to obtain additional information and provide safety instructions, for example.

As described herein, the scalability of the crisis management and notification system allows the system to be used effectively in facilities of different sizes and layouts. The system is also flexible, enabling the alarm system to be configured to integrate with existing fire or other alarm systems or to operate independently as a new crisis notification or alarm system.

Although the crisis notification system described herein can be incorporated into existing alarm communication backbones, such as existing fire alarm systems, or stand-alone security crisis alarm transmission devices, the preferred embodiment is an independent, stand-alone system, made up of smart devices (as described in detail below), stationary pulls, and buttons, wearable pendants, strobe devices, among other devices as described herein. In addition, although the notification system can be incorporated into existing fire alarm systems, for example, the signal that is created in the present security crisis notification system is distinct and separate from any fire alarm signal that may propagate on the same communications bus. The system may also employ innovative notification devices for detecting a security crisis, or for taking preventative action during a security crisis, and these devices can be integrated into other notification devices and systems.

Figure 1:
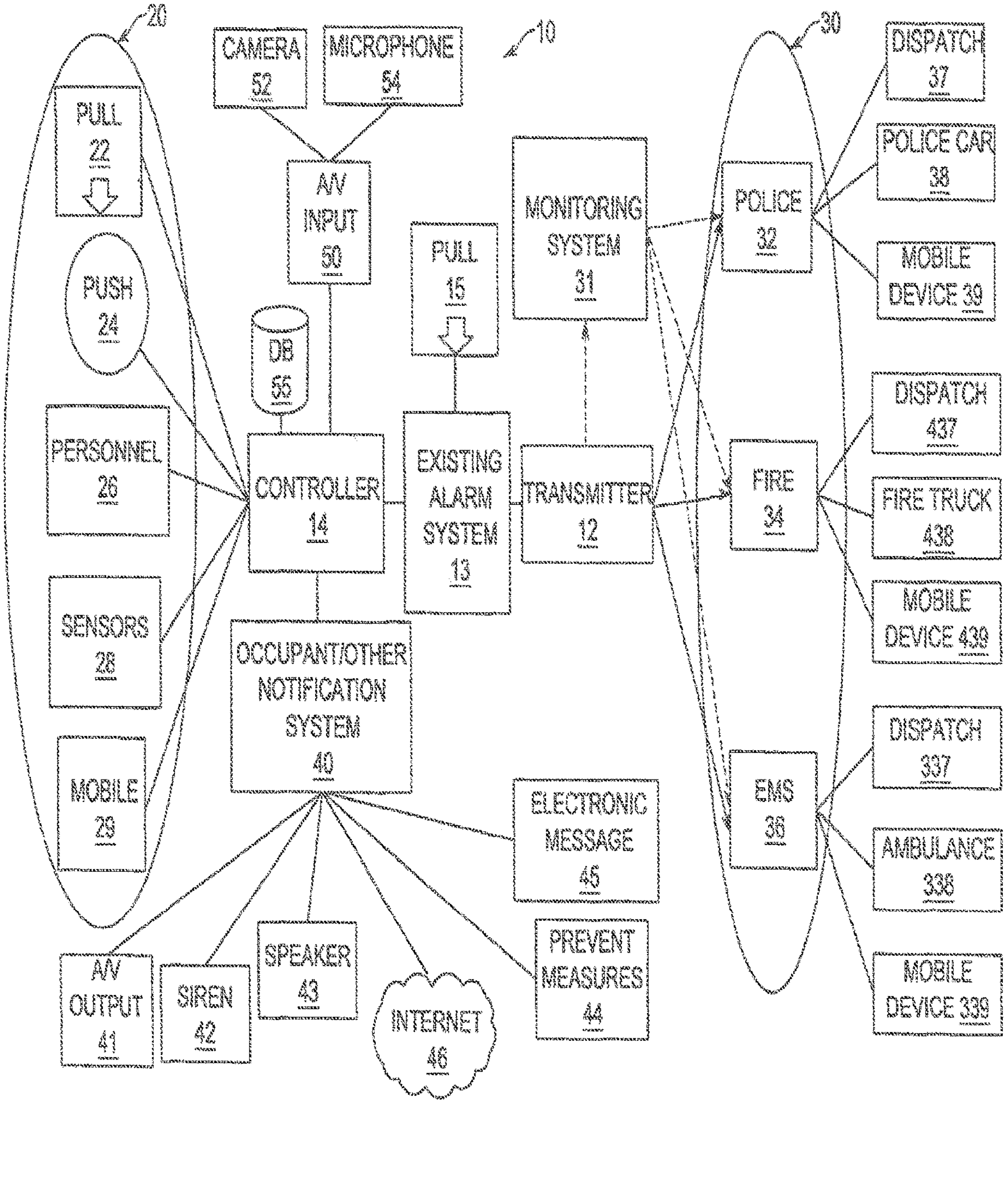
FIG. 1 is an incident alarm, management and notification system in accordance with the present disclosure.

FIG. 1 shows an exemplary crisis notification system or a crisis management system 10. The system 10 comprises a transmitter 12, an optional existing alarm system 13, a controller 14, and a plurality of alarm actuator devices 20 that can be activated to inform first responders and/or individuals in the vicinity and others of a security crisis.

Exemplary embodiments of alarm actuators 20 include smart actuation devices 22 (similar to existing fire alarm pulls), push button actuators 24 (both manually actuated), and personnel actuators or pendants 26 that can be worn by an individual and depressed to send a wireless signal to the notification system 10 if a security crisis occurs. These devices are manually actuated and can be located at specific locations throughout a facility based on a variety of factors. Exemplary pull down device or smart actuation device 22 placement factors include traffic pattern, building use, occupant age, floor levels, access patterns, egress patterns, and administrative layouts. The smart actuation devices 22 can be wired to the system 10 or in the preferred embodiment are wireless transmitters. The system also may include one or more repeaters to ensure that system signals reach all intended locations.

Further, the personnel actuators or pendants 26 and/or mobile actuators 29 may have GPS functionality or features so that a precise location or approximate location can be determined when the personnel actuator 26 is depressed, or even afterwards to locate the personnel actuator 26. The location of the device can also be determined through triangulation as understood by those having ordinary skill in the art.

Additional actuators 20 can include sensors 28, such as door and window detectors for detecting an unwanted breach of a door or window, audible detectors for detecting sounds at certain decibel levels such as gunshots, broken windows, etc., and mobile actuators 29 that can be used in a mobile environment such as a school bus. Once a sound that resembles a gunshot is detected, the location can be determined using different methods, including triangulation methods, etc. As described herein, each of these actuators 20 can be equipped to provide the location of the actuator at the time it is actuated.

In a security crisis event, the controller 14 determines the location of the activation (usually where the security crisis is occurring) and utilizes the transmitter 12 to send a notification (including the location information) of the security crisis either through a monitoring organization or directly and immediately to the first responders 30, such as the police force 32, the fire department 34, or EMS 36. Of course, additional responders can receive the notification, such as FBI or SWAT, designated command group, building leaders, etc.

Further, a medical alert system can be added to the crisis alert system, or piggybacked onto the system, such that, to the extent the area is safe, medical responders can be notified and have a chance to respond as quickly as possible. Once the crisis notification system has been installed, the addition of a medical alert system is simple and straightforward, and may merely include an additional pull down, possibly in another color. For example, if the fire alarm devices are red, the crisis alert devices are blue, a medical alert device may be green.

By notifying the (monitoring organization or) police force 32, the notification can be sent to a central dispatch 37, to specific squad cars 38 or to mobile devices 39, such as mobile phones, laptop computers, and computer tablets. This method provides the quickest form of notification to those first responders that need to respond to the security crisis. Further, as described herein, along with the notification, which notifies the first responder of the security crisis and where it is occurring, additional information, such as audio and video signals of the arena, can be transmitted to the first responders at the squad car 38 or through mobile devices 39. The system 10 can also provide information and notifications to a command group or a building leadership response group, which is a group of individuals as described herein predetermined to receive the notifications of the emergency crisis. These individuals will have a need to know of the crisis and may have expert or other knowledge of the building, the surroundings, these types of situations or other need to know reasons for being included in the predetermined group.

Additionally, secure communications with building occupants, others in the crisis arena or designated personnel can be initiated upon determining that a crisis exists. Further, to the extent that the first responders do not have full-time access to the facility or area, a link on a website can be incorporated to allow the first responders to access the facility video or audio at that time, or additional information pertaining to the building or public location.

As described above, the controller 14 polls the alarm actuation devices 20, including the manually operated smart actuation devices 22, push button devices 24 and personnel actuators or pendants 26, among others, such that when an alarm actuator device 20 is activated, the controller 14 receives a signal to activate the alarm system 10. The controller 14 can determine the originating alarm actuator device 20 and its location. The controller 14 then activates an occupant notification system 40, possibly through the smart device, such as the existing or new PA system, and may also commence building safety measures. Besides notifying building occupants, or others in a public location near the security crisis, the occupant notification system 40 may provide notifications to other individuals, such as a command group or building leadership response group, that have a need to know about the security crisis alert. These individuals can include a predetermined group of individuals that may have expert knowledge of the particular building and safety measures, and have a need to know when an incident or emergency crisis has been detected. The non-first responder individuals described above, may include experts in crisis situations, administrators, principles of nearby schools, individuals in nearby offices, residents living nearby and parents of children at the school, among others. The Notification system 40 can be configured to provide different notifications to the different groups or recipients, depending on the security crisis.

Exemplary embodiments of building occupant and other public location notification devices 40 include an audio/video output 41, sirens 42 such as bells, whistles, stroboscopic lights, and speakers 43, such as those in the existing PA system or others. In the preferred embodiment, all of the devices 40 can be implemented through a wireless system, although the strobes may or may not be wired together. Exemplary embodiments also include building safety measures 44 including solenoids that close and lock certain doors or access ways. Additional embodiments include the transmission of electronic messages 45 through email, text, SMS or other predetermined techniques, and transmission of messages to social networks through the Internet 46, among others.

The controller 14 determines the point-identifiable location of the alarm actuator device 20 that was actuated or activated and then formats the point-identifiable signal notification according to the transmitter 12 communication protocol. Along with the location information, the controller 14 may be capable of receiving additional information, such as video and sound, from one or more A/V input devices 50, which receive information at the security crisis location from cameras 52 and/or microphones 54. This additional information can be combined with the signal being sent to the first responders or it can be transmitted separately.

The transmitter 12 receives the point-identifiable signal notification and any additional information from the A/V input devices 50, formatted as necessary by the controller 14 and according to the transmitter 12 communication protocol. The controller 14 may also have a database 55 containing information about the particular building or location, such as floor layout, utilities, power grid, etc. and that information may also be transmitted to the first responders to assist in responding to the security crisis.

Upon receiving the signal, the transmitter 12 immediately sends the point-identifiable signal notification and any additional information as necessary formatted according to the transmitter 12 communication protocol to the first responders 30 or to a monitoring organization or system or the pre-designated command group or leadership group 31. If the transmitter 12 transmits to the monitoring organization 31, then the monitoring organization 31 transmits the notification and/or information to the first responders 30. The first responders 30 receive the notification and additional information, at the locations and using the devices described above, from the crisis notification system 10 and then can respond to the security crisis with this additional knowledge. Authorized personnel can reset the alarm system 10 after elimination of the security threat.

As described herein, the crisis notification system 10 can be configured to work with an existing building fire alarm system 13 that use similar pull devices 15, or the crisis notification system 10 can be a standalone system as in the preferred embodiment. The existing alarm system 13 can be tied into or coupled with the controller 14 to provide an additional input for determining when a crisis has occurred. In addition, as described herein, each of the components of the crisis notification system can be wired together, or as in the preferred embodiment, can be a part of a wireless system, using repeaters where necessary.

The plurality of alarm actuator devices 20 can be electrically connected to the controller 14. Electrical connections include all known electrical communication methods including, but not limited to, hardwired (possibly through an existing alarm system) and wireless communication technologies, such as those that use radio frequencies in the 900 MHz, 2.5 or 5 GHz range, Wi-Fi, Bluetooth, ZigBee, etc., all of which are known to one of ordinary skill in the art.

As described above, the smart actuator 22 may be manually actuated by pulling down on a handle, similar to the red fire alarms in many school buildings, while the push button actuator 24 is activated by manually pushing down on the push button. These devices can be located at specific locations throughout a facility based on a variety of factors. Exemplary manual actuator 24 placement factors include traffic pattern, building use, occupant age, floor levels, access patterns, egress patterns, and administrative layouts. Sometimes, these manual actuation devices 24 will be located in out of the way places, such as under desks or tables, where depressing the button would not be noticed in a crisis event.

The personnel actuator or pendants 26, which are also manually actuated, include a variety of devices carried on or by an individual. An exemplary personnel actuator 26 is an electronic pendant system that is connected to the controller 14 via a wireless connection, as described herein. The personnel actuator 26 can be electrically connected to the controller 14 in any of the known electrical communication methods. In the exemplary system, personnel actuators 26 are placed in the possession of strategic faculty or staff members for manual actuation. In addition, the personnel actuators 26, since they are mobile, can be depressed a number of times during the security crisis, which can provide additional information as to the location of the individual wearing the personnel actuator 26, and ostensibly, where the security crisis has moved to.

The smart device in the building occupant notification system 40, which includes various notification devices, such as the existing or an added PA system, strobe lights, and speakers, and which is used to warn the command group as described herein, along with building occupants and others, of the security crisis or threat through the use of notification devices 41-45, is flexible and can be integrated with existing mass notification devices. An exemplary mass notification system 40 may send out text or other communication messages 45 to every listed occupant of the building and their emergency contacts upon activation of a crisis management and notification system 10. The exemplary system may also broadcast notification through other communication methodologies and mediums such as the Internet 46, or radio or cable. Further, the security crisis management system 10 provides for designated building occupants or those in or near the security crisis arena to communicate with first responders through the system 10. The communication can be via text, electronic mail, or voice and allows for a direct link from the crisis arena to the first responders, and may also include safety steps or directions for those in the crisis arena.

Figure 2:
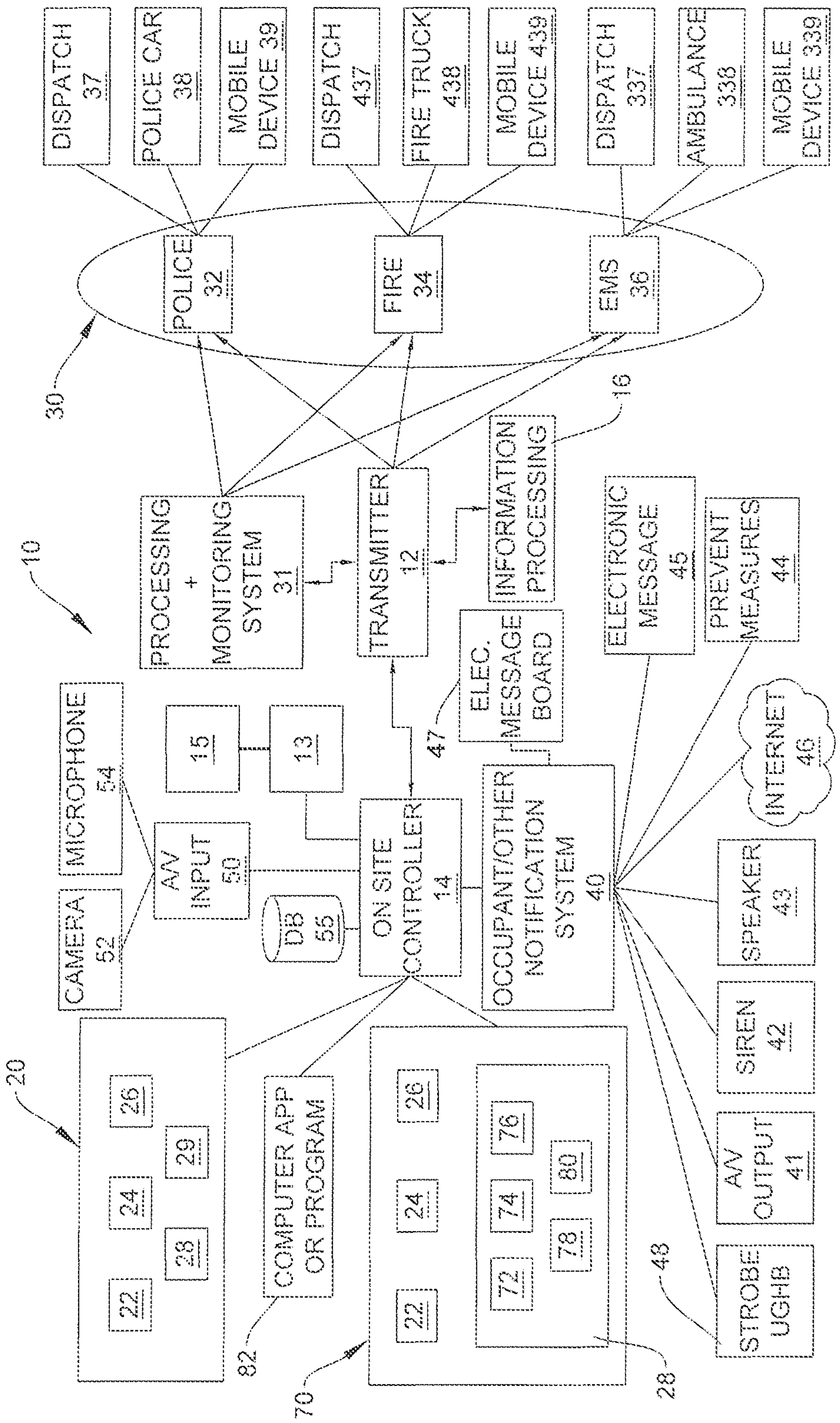
FIG. 2 is an incident alarm, management and notification system in accordance with the present disclosure.

FIG. 2 also shows an exemplary incident management and notification system or a crisis management system 10 as described in detail above. Similarly, the crisis management system 10 comprises a transmitter 12, an optional existing alarm system 13 (using a pull device 15), a controller 14, and a plurality of alarm actuator devices 20 that can be activated manually or automatically to obtain information, manage the information and inform first responders and/or individuals in the vicinity and others, of a crisis. As with the system 10 described above, the existing alarm system 13 and the associated pull device 15, can be tied into or coupled with the controller 14 to provide an additional input for determining when a crisis has occurred. The crisis management system 10 also comprises smart actuator devices 70 that may be used in conjunction with or instead of the alarm actuator devices 20. Additionally, the crisis management system 10 includes a computer program or application program (or app) 82 that can be used with the crisis management system 10 to activate the system or to receive alerts that the system 10 has been activated. The app 82 can be used by those in the command group or by others to provide a quick response, when necessary, and to also provide feedback if the system 10 was inadvertently activated.

In the preferred embodiment, the controller 14 is on site, or located in the building where the system 10 is installed. The controller 14 may include a processor and related hardware and software to provide some or all of the command and control functionality, depending on the particular configuration. As such, the controller, similar to the processing and monitoring system described below, can poll or monitor the input devices, such as the actuators 20 and smart actuators 70, along with the computer app or program 82, as described herein, to determine when or if an emergency crisis has occurred. The controller 14 also has the capabilities to control the notification system 40, based on the inputs, as described herein.

Exemplary embodiments of smart actuators devices 70 include some or all of the actuators devices 20 described herein, such as smart actuation devices 22, push button actuators 24, and personnel actuators or pendants 26 that can be worn by an individual and depressed to send a wireless signal to the crisis management system 10 if a security crisis occurs. These particular devices 20 are manually actuated and can be located at specific locations throughout a facility, as described herein, and can be wired to the crisis management system 10 or use wireless transmitters and GPS functionality. The crisis management system 10 may also include repeaters to ensure that system 10 signals reach all intended locations. As with the crisis management system 10 shown in FIG. 1, the actuators 20 can also include automatic sensors 28 and related software, such as door and window detectors for detecting an unwanted breach of a door or window, audible detectors for detecting sounds at certain decibel levels such as gunshots, broken windows, etc., and mobile actuators 29 that can be used in a mobile environment such as a school bus. Once a sound that resembles a gunshot is detected, the location can be determined using methods such as triangulation, etc. As described herein, each of these automatic sensors 28 can be equipped to provide the location of the sensor 28 at the time of actuation.

The smart actuators devices 70 further include additional automatic sensors 28 and functionality, as described herein, to assist in decreasing the response time to a crisis and to help verify an actual crisis as opposed to an inadvertent or false actuation. The smart actuators devices 70 may further comprise sensors 28 such as one or more cameras 72, microphones 74, speakers 76, along with gunshot sensors, and other devices that can be used for obtaining information before and during a crisis (see FIG. 5). Thus, the smart actuators devices 70 can comprise manual devices 22, 24, 26 and automatic actuator devices 28, 29, in different combinations depending on the particular need.

As detailed herein, the controller 14 determines the location of the activation, can verify the activation, and then utilizes the transmitter 12 to send a notification of the crisis either through a process and monitoring system 31 (the preferred embodiment) or directly to the first responders 30, such as the police force 32, the fire department 34, or EMS 36. Of course, additional responders can receive the notification, such as FBI or SWAT, etc. For ease of understanding, the controller 14 and transmitter 12 are shown as separate devices herein; however, they can be separate or are often combined into a single device.

The transmitter 12 (or the combination transmitter 12 and controller 14) utilize information processing functionality 16 to further process the information received and transmit that information either to the processing and monitoring system 31, or directly to the first responders 30. Additionally, the processing and monitoring system 31, which in the preferred embodiment is located remotely from the crisis arena, can provide processing functionality of the information received from any one or a combination of the manual actuation devices 20, smart actuation devices 70, or the computer app 82. The on-site controller 14 works with the remote processing and monitoring system 31 to obtain the crisis arena information, process it as necessary, and provide it to the various groups that need that information, including the first responders, the command group, and the building or crisis arena occupants.

In the preferred embodiment, the processing and monitoring system 31 can obtain the raw or partially processed data from the on-site controller 14, through the (separate or combined) transmitter 12, and process the raw data at the control station. As such, the processing and monitoring system 31 is the gateway from the information gathering (and possibly partial processing) to the different groups of individuals that are to receive information and notifications.

As described above, whether the crisis management system 10 uses manual or automatic actuation devices 20, 70, or information received from the computer app 82, a medical alert system can be added to the crisis alert system, or piggy-backed onto the system, such that, to the extent the area is safe, medical responders can be notified and have a chance to respond as quickly as possible. Once the crisis management and notification system 10 has been installed, the addition of a medical alert system is simple and straightforward, and may merely include an additional smart actuation device, possibly in another color. For example, if the fire alarm pulls are red, the crisis alert pulls are blue, a medical alert pull may be green.

As described herein, once a crisis has been received and verified, the transmitter 12 can send notifications to police 32, fire 34 and/or EMS 36 as necessary, which can then notify for example central dispatch 37, specific squad cars 38 or mobile devices 39, such as mobile phones, laptop computers, and computer tablets. Verification can be accomplished in a number of different ways, including a dual stage verification based on a combination of local manual actuation from manual smart devices 20 and automatic activation received from automatic actuation devices 70.

This method provides the quickest form of notification to those first responders that need to respond to any crisis. Further, as described herein, along with notification of the crisis, additional information, such as audio and video signals of the arena, can be transmitted to the first responders at the squad car 38 or through mobile devices 39. Additionally, secure communications with building occupants, others in the crisis arena or designated personnel can be initiated upon the determination and verification of a crisis. Further, additional information pertaining to the building or public location can be transmitted as well.

As described herein, the controller 14 polls the alarm actuation devices 20 including the manually operated smart actuation devices 22, push button devices 24 and personnel actuators or pendants 26, along with the automatic actuator devices 70, including one or more cameras 72, microphones 74, speakers 76, strobes 78, sirens 80, among other devices, such that when an alarm actuator devices 20, 70 are activated, the controller 14 receives a signal to activate the alarm system 10. The controller 14 can determine the originating alarm actuator device 20, 70, 82 and its location. The controller 14 then activates the occupant notification system 40, which notifies those in the arena, possibly through the A/V output 41, a siren 42, existing or new PA system 43, strobe lights 48, and may also commence building safety measures, through the computer app 82, electronic message boards 47, electronic messages 45, such as SMS, text, email, social media, etc., possibly through or in association with the Internet 46.

Similar to that described in FIG. 1 above, exemplary embodiments of the notification system 40 and related devices for notifying building occupants, the command group or building leadership response group, and others, include an audio/video output 41, sirens 42 such as bells and whistles, speakers 43, such as those in the existing PA system or others, and stroboscopic lights 48. In the preferred embodiment, all of the devices connected to the notification system 40 can be implemented through a wireless system; however, some of the devices, such as the strobes 48, could be strategically wired together. Exemplary embodiments to be part of the notification system 40 also include building safety measures 44 including solenoids that close and lock certain doors or access ways, the transmission of electronic messages 45 through email, text, SMS or other predetermined techniques, and the transmission of messages to social networks through the Internet 46. Additionally, electronic message boards 47 in the crisis arena can be used to notify occupants and others of information pertaining to the ongoing crisis, among other notification devices.

For example, the incident management and notification system 10 can determine if an assailant was originally in a particular building in one location, based on activation of a smart actuation device 22 and cameras 72 and microphones 74 in that smart actuator device 70, and if that assailant had moved to a different location in the building based on other smart devices 70 and/or other activated smart actuation devices 22. Cameras 72 and microphones 74 can utilize buffering software to keep information, for example, 30 second buffering, to assist in the verification of the crisis and the determination of the situation. The incident management system 10 can also use time-stamp software and technology to keep track of the crisis for recording, reporting, investigations and training at future times.

Artificial intelligence may utilize the transmitted dynamic information, along with static building information, to determine a strategy for first responders, and different strategies (flee or remain in place) for those building occupants that may be located in the building near the crisis. Additionally, in the event of an actual crisis, an artificial intelligence system can be utilized to create a lockdown of an area where an assailant may be located, while automatically unlocking other doors and/or windows to allow building occupants to escape, while informing first responders that those leaving the building at those sites are not the perpetrators, thereby reducing the chance of occupants being accidentally injured.

Besides notifying building occupants or others in a public location near the security crisis, the occupant notification system 40 may provide notifications to other individuals that have a need to know about the security crisis, such as administrators, principles of nearby schools, nearby offices and residences and parents of children at the school. The incident management and notification system 10 can be configured to provide different notifications to different recipients depending on the security crisis.

The incident management system 10 are capable of tracking building occupants, such as students or workers, through their smart phones. After a particular person registers, subscribes or otherwise provides initial permission, upon actual crisis activation and during the crisis, the location of building occupants can be determined, through GPS and other location functionality, and those subscribers notified of the crisis as necessary. Additionally, location of multiple building occupants (subscribers) and their collective movement can be used to determine the situation in the arena, such as groups of people moving, hiding, being held hostage, etc.

Using artificial intelligence along with input about the building layout, possible location of emergency, and other situational awareness, subscribers (and first responders) can be provided recommendations for exiting the arena (including explicit instructions for doing so), for remaining in their current location, etc. Additionally, subscribers or occupants may have real time access through their smart devices, such as phones, and the crisis management system to first responders to provide dynamic information pertaining to the crisis, or to be informed as to steps to take to reduce harm or injury and exit the arena.

Along those lines, the smart actuator devices 70 are capable of gathering information at or near the scene of the crisis, using cameras 72 and microphones 74, and utilizing artificial intelligence algorithms to identify assailant and track assailant's movement as the crisis occurs in real time.

Noise levels at particular locations, based on the camera on the smart actuator device 70 or stand-alone 52 can be used to highlight areas of chaos or gunshots to track likely areas of conflict. These areas can be superimposed over building layouts to assist first responders in determining actions to be taken to reduce injury and harm to others.

Additionally, the smart actuator devices 70 are capable of self-test functionality or able to supervise themselves (or are capable of being supervised remotely). These self-tests ensure that the devices 70 are in working condition and that their battery is sufficient for example to carry out the device functions, that there is proper battery backup, that any attempt at device disablement and/or tampering is prevented, among other functions. The devices 70 can be configured to include redundancies, such as redundant communications to prevent cases of tampering with the incident management system 10, or attempts to shut down the system 10, and that the smart devices 70 communicate through the system 10 when they are not operating at optimal capacity.

Figure 3:
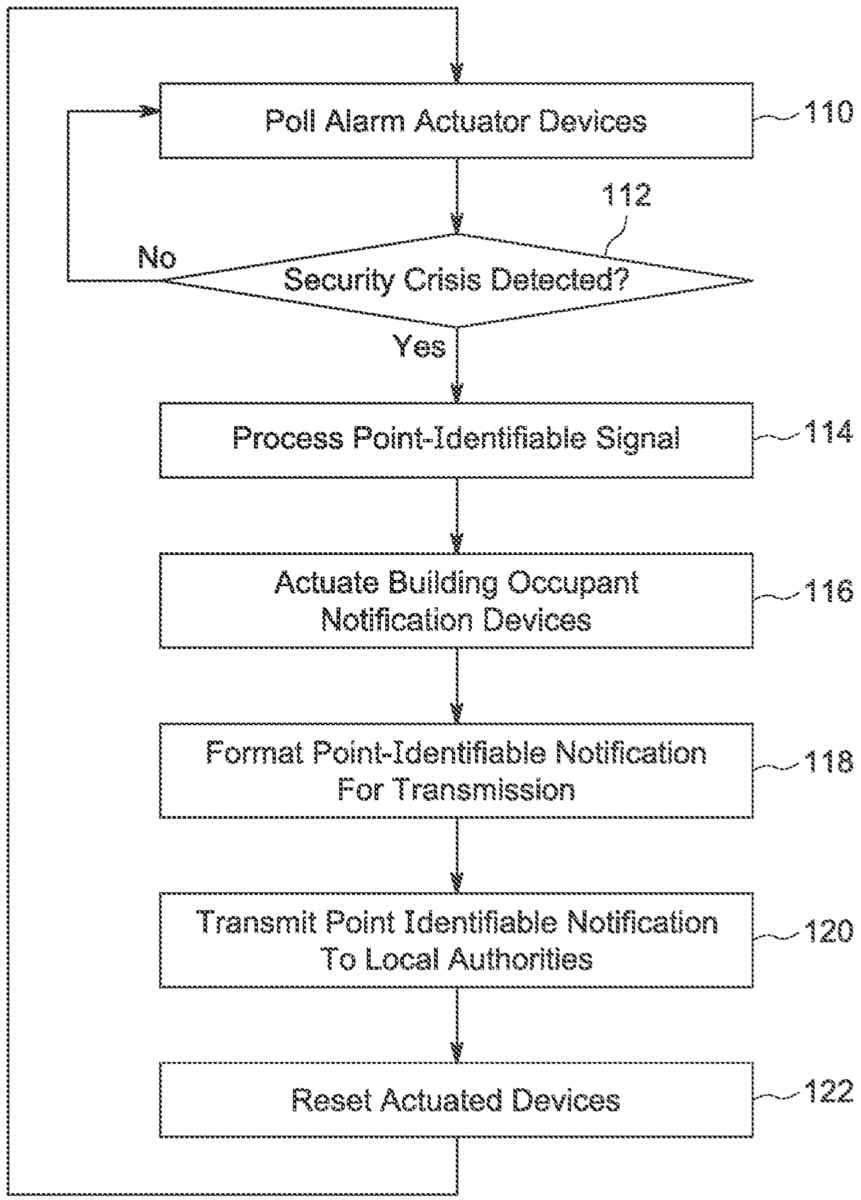
FIG. 3 is a flow chart illustrating the incident alarm actuation, management and notification in accordance with the present disclosure.

FIG. 3 shows an exemplary flow chart detailing the steps that can be performed in accordance with the preferred embodiment of the security crisis notification system 10.

As described in detailed herein, the controller 14 polls the alarm actuation devices 20, 70 at step 110. When an alarm actuator device 20, 70, such as a smart alarm actuation devices 22, a push button 24, a pendant 26, or a sensor 28, is manually actuated or activated by a sensor 28, such as a camera 72, or microphone 74, controller 14 detects a security event or crisis at step 112. The controller 14 processes the point-identifiable notification signal at step 114 to determine the location of the actuator 20, 70 that was activated. The controller 14 then signals the occupant and other notification system 40 to actuate the building occupant notification devices 41-46 at step 116, in accordance with predetermined protocol or as controlled by the system depending on the crisis. The controller 14 then formats or incorporates the point-identifiable information into the occupant notification strategy to provide specific instructions and safety information to building occupants and others depending on the activated actuator device 20, 70 location within the facility at step 118.

In the preferred embodiment, each alarm actuator device 20, 70, 82 of the crisis notification system 10 is point-identifiable, so that the particular device and/or location can be determined along with any other necessary information, upon activation. A monitoring system 31 can be located in between the crisis notification system 10 and the first responders 30, such that when an activation occurs, the monitoring system 31 is first made aware of the crisis and can then relay the notification, the device location, and any other information as needed, to the first responders 30 in accordance with previously determined police or responder protocols.

As described above, the controller 14 may also include additional information from the A/V input devices 50 and from the database 55 pertaining to the building information. The transmitter 12 can then receive the formatted signal and send the formatted point-identifiable notification signal and any additional information to the first responders 30 through a dispatch 37 (if configured as such), to the squad car 38 or to mobile devices 39 or in other ways at step 120. The system 10 may continue to update the additional information as necessary, including audio and visual information pertaining to the crisis. The dispatch or monitor can then dispatch first responders to address the crisis or security threat. The alarm system 10 is reset at step 122.

Battery backups can be incorporated into the point-identifiable actuation devices 20, 70 to ensure that the devices 20, 70 are always powered. The system 10 can supervise or check in with each device 20, 70 to make sure the device 20 is powered and in working order. This supervision process can occur periodically, for example every few minutes, to supervise the system 10 for proper function, low battery, missing pendants, etc. The system 10 can keep track of the supervision function in a database, and accordingly, the system 10 can generate reports on the system devices or the system as a whole.

Figure 4:
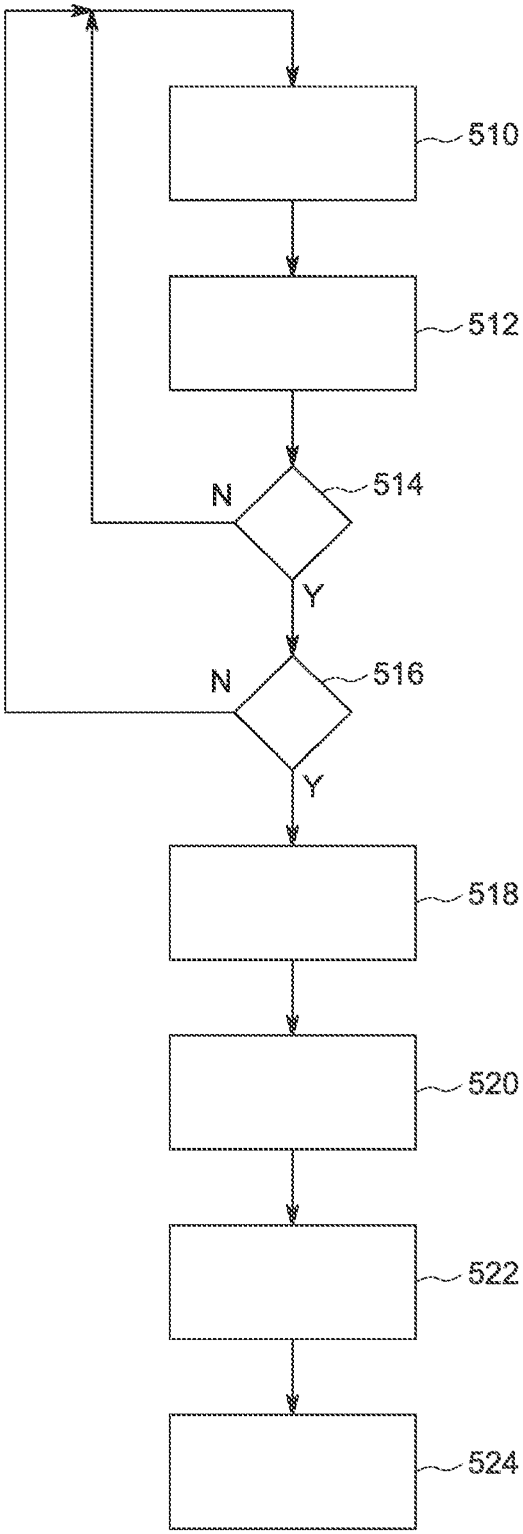
FIG. 4 is a flow chart illustrating the incident alarm actuation, management and notification in accordance with the present disclosure.

FIG. 4 also shows an exemplary flow chart detailing the steps 500 that can be performed in accordance with the preferred embodiment of the crisis management and notification system 10.

As described in detailed herein, the controller 14 polls the manual actuation devices 20 at step 510 and the automatic actuator devices 70 at step 512. When any of the alarm actuator devices 20, 70, such as a smart alarm actuation devices 22, a push button 24, a pendant 26, or a sensor 28, is manually actuated, or activated by a sensor 28, such as the a camera 72, or microphone 74; the controller 14 detects a security event or crisis at step 514. The controller 14 next verifies the crisis, for example, through dual-verification at step 516.

If the crisis or threat is verified at step 516, the cell phones of the subscribers that had previously registered are activated at step 518. Simultaneously, the system 10 provides the real time location of those subscribers at step 520, which can assist in determining the real time crisis location at step 522. Clearly, steps 518, 520 and 522 can be accomplished in any order and should happen simultaneously.

The controller 14 then transmits the real time crisis information as described herein, to the first responders and signals the occupant and other notification system 40 to actuate the building occupant notification devices 41-46 at step 524. These notifications are provided in accordance with the predetermined protocols or as controlled by the system 10 depending on the crisis.

In the preferred embodiment, as described herein, each alarm actuator device 20, 70 of the crisis notification system 10 is point-identifiable, so that the particular device location can be determined along with any other necessary information, upon activation. A monitoring system 31 can be located in between the crisis notification system 10 and the first responders 30, such that when an activation occurs, the monitoring system 31 is first made aware of the crisis and can then relay the notification, the device location, and any other information as needed, to the first responders 30 in accordance with previously determined police or responder protocols. The system 10 proceeds as described above.

Figure 5:
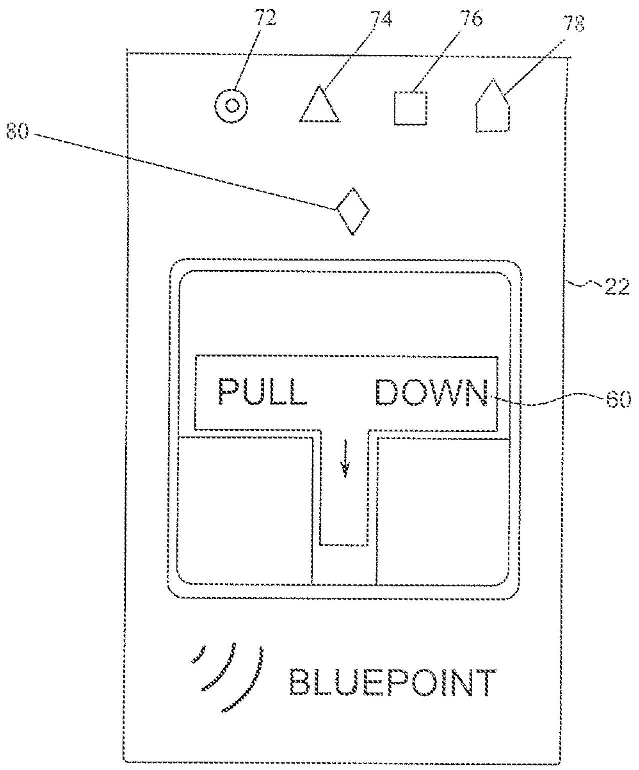
FIG. 5 is a perspective view of a smart pull-down security incident alarm actuation device in accordance with the present disclosure.

FIG. 5 shows an exemplary smart automatic actuated device 70 that can be automatically actuated in the event of an emergency. The smart automatic actuated device 70 can be color coded to indicate in which type of automatic actuated device 70 should be used. For example, a blue smart actuation devices 22 device 70 can be used for security crises, while a red device 70 could be used for a crisis that involves a fire, and a green device 70 could be used for medical emergencies. The device 70 may have a pull handle 60 on the front which faces outward, so that an individual can pull the handle 60 down, thus actuating it, in the event of a crisis. The smart actuator device 70 also comprises mechanisms that make the device 70 automatic in function, including one or more cameras 72, microphones 74, speakers 76, strobes 78, sirens 80, among other devices, such that when the actuator device 70 is activated, the controller 14 receives a signal to activate the alarm system 10.

Figure 6:
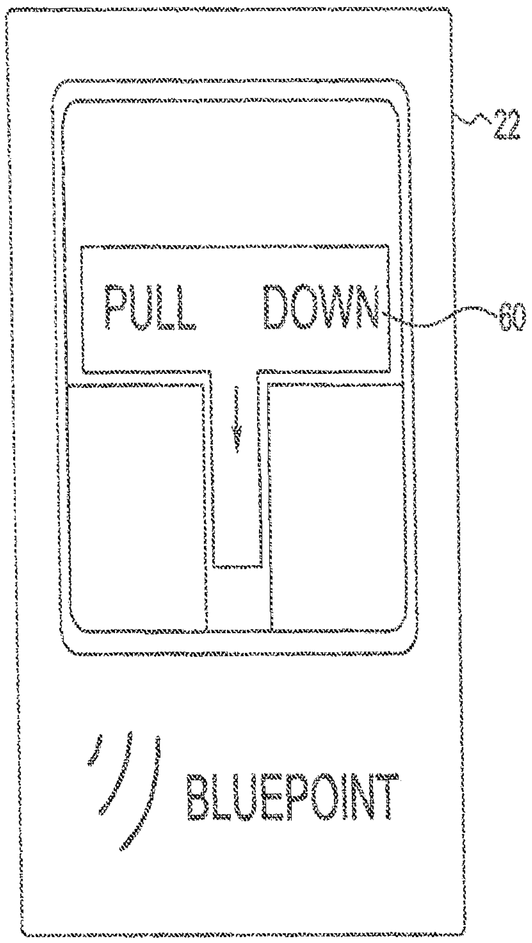
FIG. 6 is a perspective view of a manual pull-down security incident alarm actuation device in accordance with the present disclosure.

FIG. 6 shows an exemplary manually actuated pull down actuator 22 that can be manually actuated in the event of an emergency. As described herein, the pull down actuator or smart actuation devices 22 can be color coded to indicate in which type of crisis the smart actuation devices 22 should be used. For example, a blue smart actuation devices 22 can be used for security crises, while a red smart actuation devices 22 could be used for a crisis that involves a fire, and a green smart actuation devices 22 could be used for medical emergencies. Over time, individuals would understand what each color indicated just as the red pulls are known to most to be used in case of a fire. The smart actuation devices 22 has a pull handle 60 on the front of the smart actuation devices 22 which faces outward, so that an individual can pull the handle 60 down, thus actuating it, in the event of a crisis.

Figure 7A:
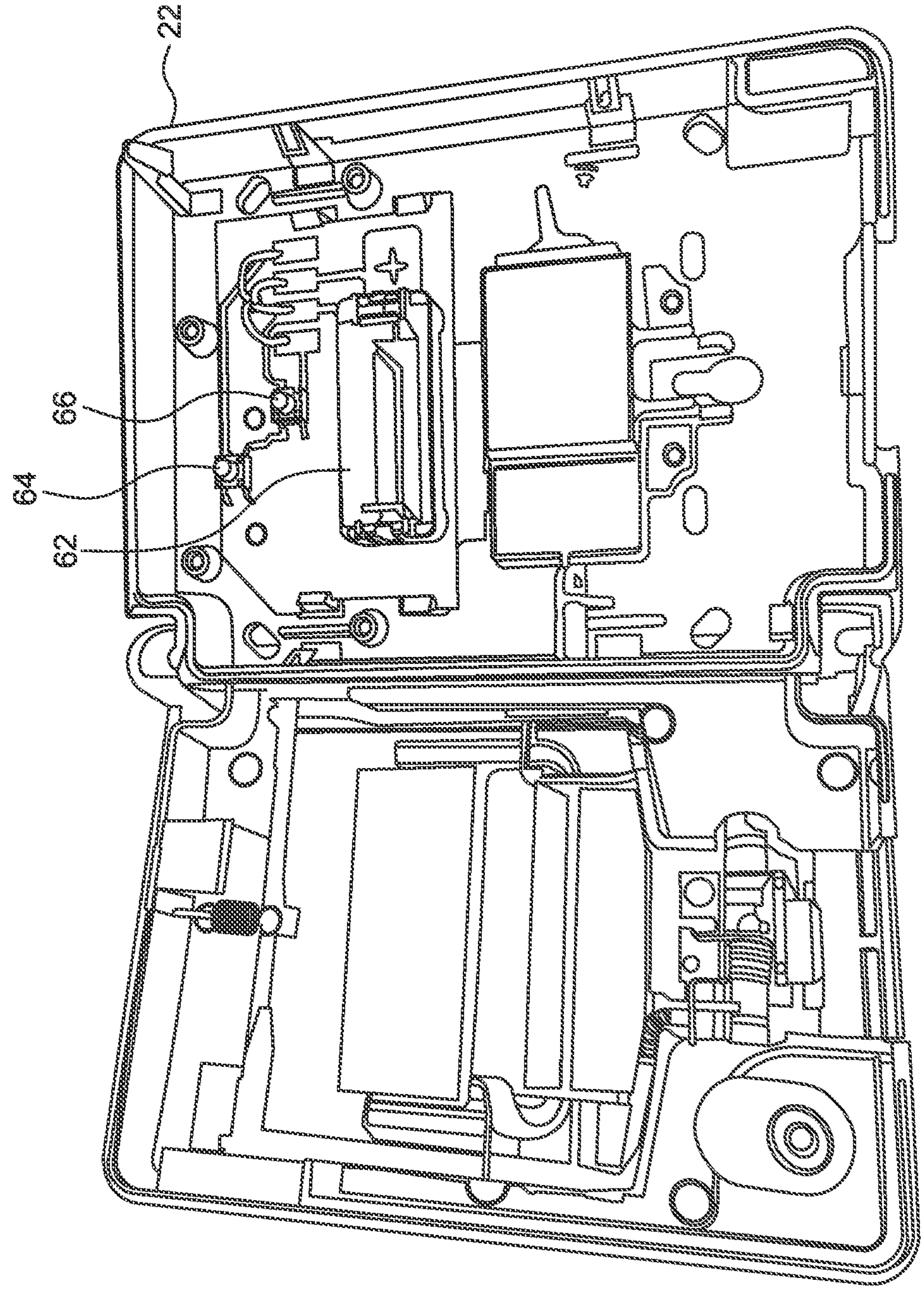
FIG. 7A is a perspective view of a manual pull-down security incident alarm actuation device in accordance with the present disclosure.

FIG. 7A shows the inside of the smart actuation devices 22 opened to show the internal components including the backup battery holder 62 (for securely retaining a backup battery), a reset switch 64, and a tamper switch 66. As discussed herein, the pull device 22 can be configured for battery power or connected to building power, with backup battery power using the backup battery holder 62, as shown here. The reset switch 64 is used for resetting the device after it has been pulled or actuated, either in a real emergency, a test run or inadvertently. The tamper switch 66 provides protection if someone attempts to tampered with the device.

Figure 7B:
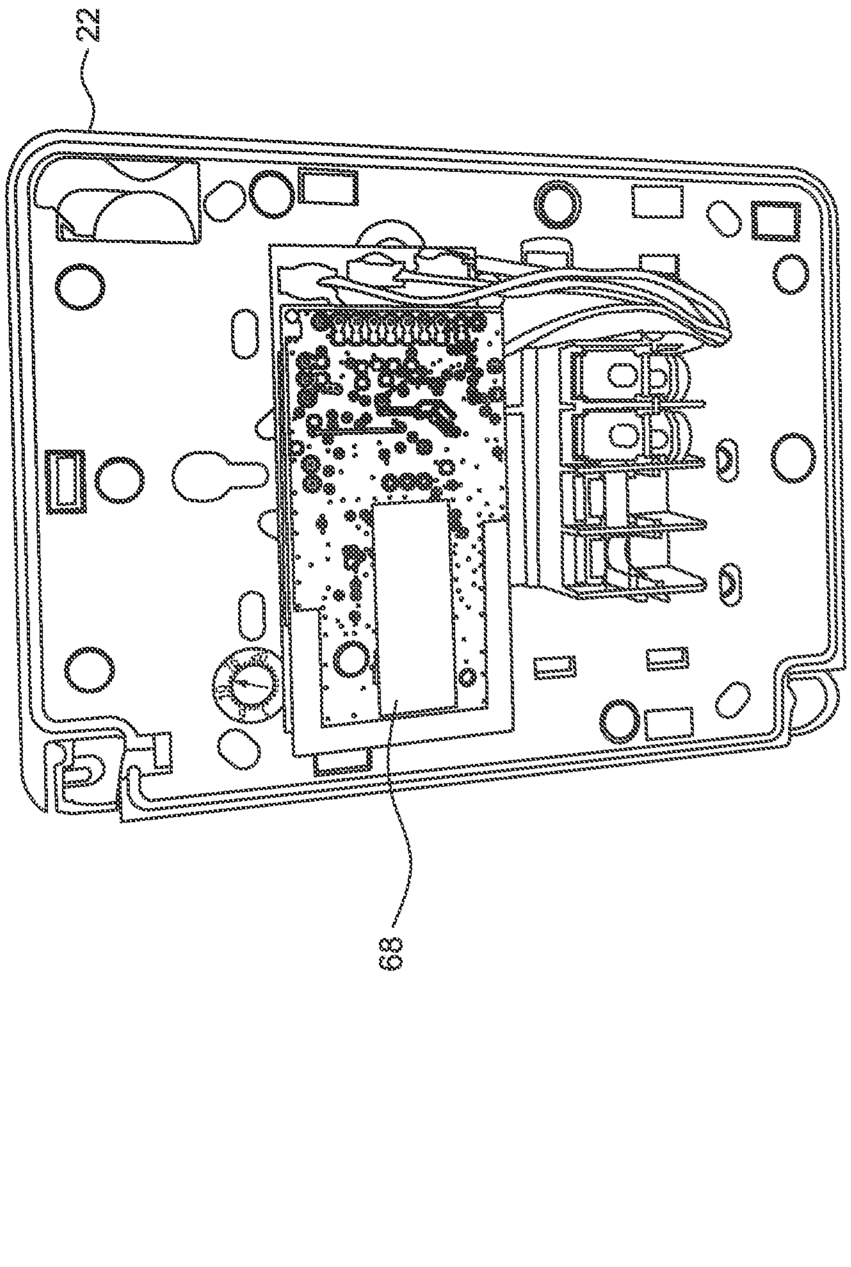
FIG. 7B is a perspective view of a manual pull-down security incident alarm actuation device in accordance with the present disclosure.

FIG. 7B shows the smart actuation devices 22 closed from the backside, which is hidden from view when closed (against the wall). The communications board 68 allows for the smart actuation devices 22 to be connected through the Internet, through Radio Frequency RF, through a VPN, or through a cellular network, among others, as described herein. The pull device 22 utilizes the communications board 68 to connect to the Internet, a Virtual Private Network (VPN), or some other communication network through a communication protocol, such as Wi-Fi, Bluetooth, ZigBee, or any other communication protocol that can be incorporated with a secure connection. Further, the pull device 22 may comprise a backup communications protocol, such as an existing cellular connection or a proprietary connection, in case the main communication protocol is disabled.

Figure 8:
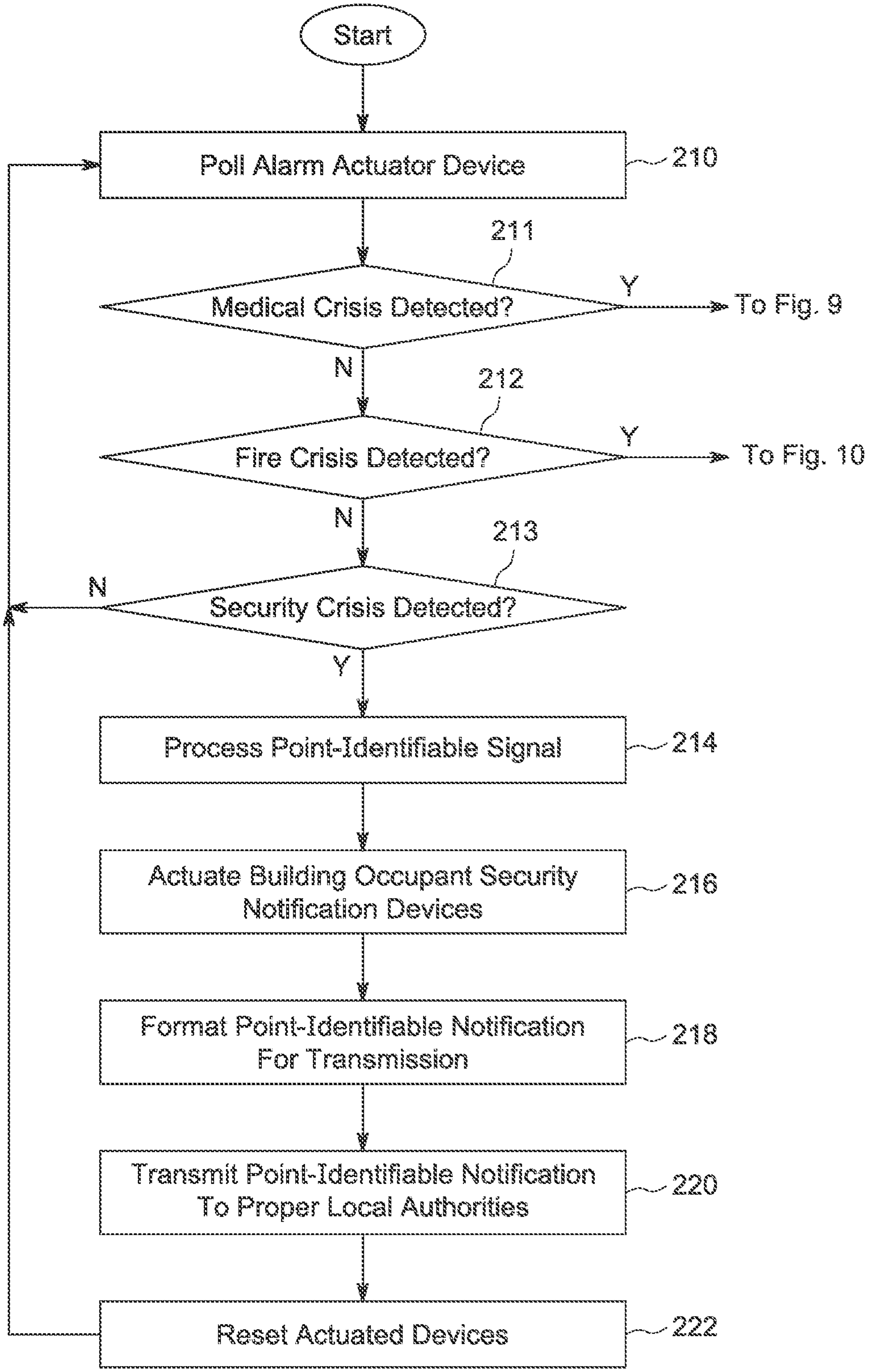
FIG. 8 is a flow chart that illustrates the crisis alarm and notification system in accordance with the present disclosure.
Figure 9:
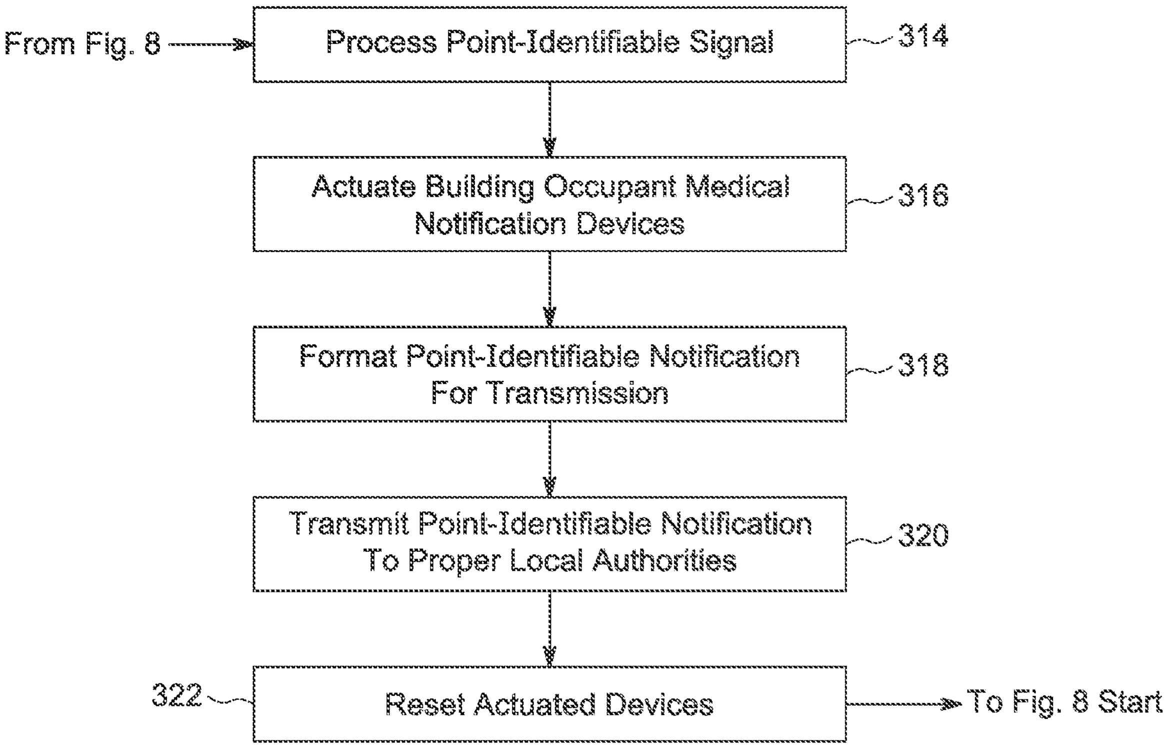
FIG. 9 is a flow chart that illustrates the crisis alarm activation and notification in accordance with the present disclosure.
Figure 10:
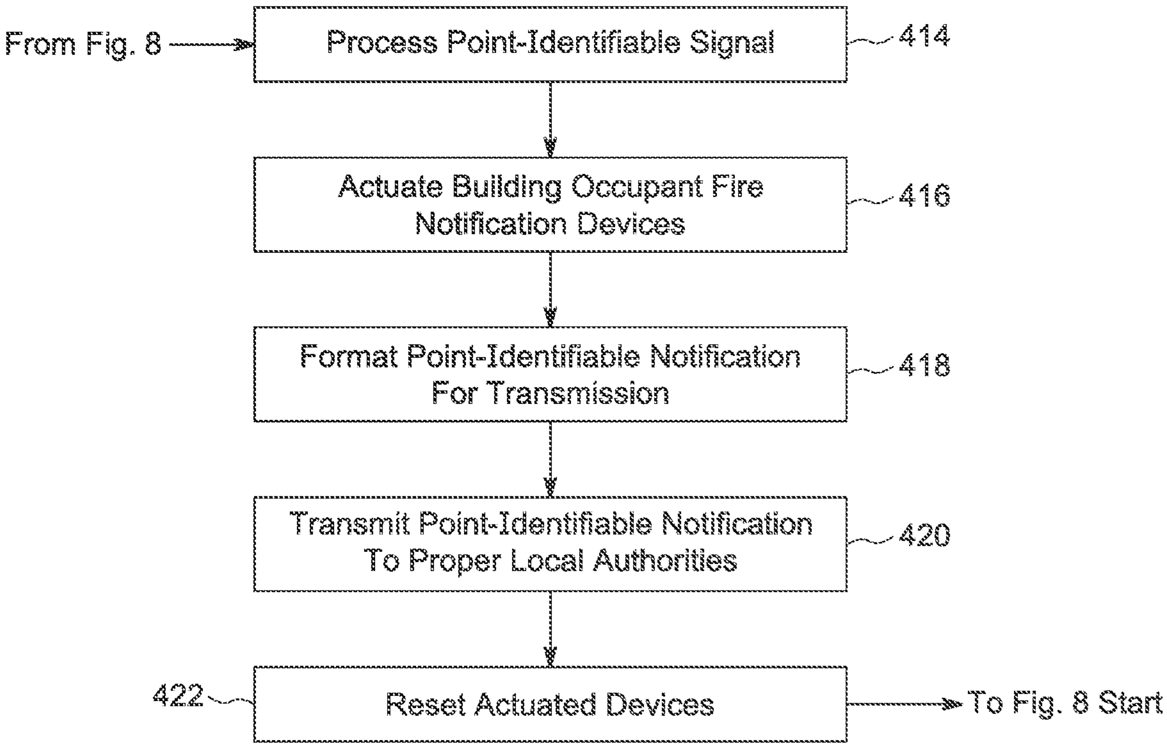
FIG. 10 is a flow chart that illustrates the crisis alarm activation and notification in accordance with the present disclosure.

FIGS. 8 through 10 are flow charts showing the crisis notification system for multiple crises in which the type of crisis must first be determined. In FIG. 8, which is similar to FIG. 3, the alarm actuator devices 20 are polled at step 210 by the controller 14 always checking for the actuation of a device 20. When an alarm actuator device 20, such as a smart alarm actuation devices 22, a push button 24, a pendant 26, or a sensor 28, is actuated, the controller 14 detects a crisis event, but needs to determine which crisis has occurred. At step 211, the controller 14 determines if the crisis is a medical crisis. If not, the controller determines if the crisis is a fire at step 212, and if not the controller 14 determines if the crisis is a security crisis at step 213. If not, the system returns to again poll the actuator devices 20. However, if the crisis is of a security type crisis, steps are taken similar to those described in FIG. 3. The controller 14 processes the point-identifiable notification signal at step 214 to determine the location of the actuator 20 that was activated. The controller 14 then signals the occupant and other notification system 40 to actuate the building occupant notification devices 41-46 at step 216. The controller 14 then incorporates the point-identifiable information into the occupant notification strategy to provide specific instructions and safety information to building occupants and others depending on the activated actuator device 20 location within the facility at step 218.

As described above, the monitoring system 31 can be located in between the crisis notification system 10 and the first responders 30, such that when an activation occurs, the monitoring system 31 is first made aware of the crisis and can then relay the notification, the device location, and any other information as needed, to the first responders 30 in accordance with previously determined police or responder protocols.

Similarly, the controller 14 may also include additional information from the A/V input devices 50 and from the database 55 pertaining to the building information. The transmitter 12 can then receive the formatted signal and send the formatted point-identifiable notification signal and any additional information to the first responders 30 through a dispatch 37 (if configured as such), to the squad car 38 or to mobile devices 39 or in other ways at step 220. The system 10 may continue to update the additional information as necessary, including audio and visual information pertaining to the crisis. The dispatch or monitor can then dispatch first responders to address the crisis or security threat. The alarm system 10 is reset at step 222.

Returning to step 211, if the controller 14 determines that the crisis is a medical crisis, then the controller 14 processes the point-identifiable notification signal at step 314 in FIG. 8, to determine the location of the actuator 20 that was activated for the medical crisis or emergency. The controller 14 then signals the occupant and other notification system 40 to actuate the building occupant notification devices 41-46 at step 316. In a medical crisis, the notification devices 41-46 may not be incorporated to allow for the crisis to be resolved without individuals being notified. The response depends on the medical emergency situation. Regardless, the controller 14 then incorporates or formats the point-identifiable information into the occupant notification strategy to provide specific instructions and safety information to the building occupants that need to know and others depending on the activated actuator device 20 location within the facility at step 318.

The transmitter 12 can then receive the formatted signal and send the formatted point-identifiable notification signal and any additional information to the first responders 30, which may include EMS or other medical responders 36, through a dispatch 337, if configured as such, to an ambulance 338, to mobile devices 339, or in other ways at step 320. The system 10 may continue to update the additional information as necessary, including audio and visual information pertaining to the medical crisis. The dispatch or monitor can then dispatch first responders to address the crisis or medical emergency. The alarm notification system 10 is reset at step 322, and returns to again poll the actuator devices 20 at step 210 (FIG. 5).

Now returning to step 212, if the controller 14 determines that the crisis is a fire or similar crisis, then the controller 14 processes the point-identifiable notification signal at step 414 in FIG. 10, to determine the location of the actuator 20 that was activated for the fire crisis. The controller 14 then signals the occupant and other notification system 40 to actuate the building occupant notification devices 41-46 at step 416. In a fire emergency, the notification devices 41-46 are usually incorporated to allow for individuals anywhere near the fire an opportunity to exit the arena and are notified as such. In some cases, it makes more sense to remain in the area for safety reasons, and again the response depends on the emergency situation. The controller 14 then incorporates or formats the point-identifiable information into the occupant notification strategy to provide specific instructions and safety information to the building occupants and others depending on the activated actuator device 20 location within the facility at step 418.

The transmitter 12 can then receive the formatted signal and send the formatted point-identifiable notification signal and any additional information to the first responders 30, which may include the fire department, particular fire trucks and other firefighting equipment 34, through a dispatch 437, if configured as such, to an Fire trucks 438, to mobile devices 439, or in other ways at step 420. The system 10 may continue to update the additional information as necessary, including audio and visual information pertaining to the fire. The dispatch or monitor can then dispatch first responders to address the crisis or medical emergency. The alarm notification system 10 is reset at step 422, and returns to again poll the actuator devices 20 at step 210 (FIG. 8).

Although a number of embodiments of this invention have been described above with a certain degree of particularity, those skilled in the art could make numerous alterations to the disclosed embodiments without departing from the spirit or scope of this invention. For example, all joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A security threat alarm system for determining and providing a location of a security threat in real time, comprising:

a plurality of alarm actuation devices, said plurality of alarm actuation devices being located in a building, said plurality of alarm actuation devices comprising a smart actuation device, wherein said smart actuation device is automatically actuated upon an existence of a security threat, wherein upon actuation, said smart actuation device transmits a location in the building where the smart actuation device that has been actuated;

said smart actuation device comprises automatic sensors, said automatic sensors configured to provide the location of the automatic sensor in real time;

a controller, said controller coupled to said smart actuation device, said controller receives said location from said smart actuation device upon actuation and transmits said location; and wherein upon actuation of said smart actuation device, a location is transmitted to said controller and said controller transmits a location of said smart actuation device that has been actuated to a first responders, thereby informing said first responder of the location in the building that said smart actuation device has been actuated in real time.

2. The security threat alarm system of claim 1, wherein, said smart actuation device comprises a camera and a microphone.

3. The security threat alarm system of claim 2, wherein said system utilizes an input from said camera and said microphone to identify an assailant as the security threat in real time.

4. The security threat alarm system of claim 1, wherein, said smart actuation device comprises a camera, a microphone and a gunshot sensor.

5. The security threat alarm system of claim 4, wherein said system utilizes an input from said camera, said microphone and said gunshot sensor to identify an assailant as the security threat in real time.

6. The security threat alarm system of claim 1, wherein, said smart actuation device comprises a camera, a microphone and a broken glass sensor.

7. The security threat alarm system of claim 6, wherein said system to utilizes an input from said camera, said microphone and said broken glass sensor to identify an assailant as the security threat in real time.

8. The security threat alarm system of claim 1, wherein said controller transmits additional information received from said smart actuation device to said first responder in real time.

9. The security threat alarm system of claim 8, wherein said additional information is received from a camera and a microphone.

10. The security threat alarm system of claim 9, wherein said camera and said microphone utilize artificial intelligence algorithms to identify an assailant and to track said assailant's movement as the security threat continues in real time.

11. A method of using a security threat alarm system for providing a location of a security threat in real time, said security threat alarm system comprises a controller, and a smart actuation device, said smart actuation device configured to provide a location upon actuation, said method comprising steps of:

a) installing a smart actuation device in a building;
b) monitoring said smart actuation device to determine if said smart actuation device has been actuated;
c) upon actuation, receiving a location from said smart actuation device that was actuated;
d) determining a location in the building that said smart actuation device has been actuated;
e) transmitting said location to a first responder; and
f) using said security threat alarm system to track said security threat in real time.

12. The method of using a security threat alarm system of claim 11, wherein, said smart actuation device comprises a camera and a microphone.

13. The method of using a security threat alarm system of claim 12, wherein said system utilizes an input from said camera and said microphone to identify an assailant as the security threat in real time.

14. The method of using a security threat alarm system of claim 11, wherein, said smart actuation device comprises a camera, a microphone and a gunshot sensor.

15. The method of using a security threat alarm system of claim 14, wherein said system utilizes an input from said camera, said microphone and said gunshot sensor to identify an assailant as the security threat in real time.

16. The method of using a security threat alarm system of claim 11, wherein, said smart actuation device comprises a camera, a microphone and a broken glass sensor.

17. The method of using a security threat alarm system of claim 16, wherein said system utilizes an input from said camera, said microphone and said broken glass sensor to identify an assailant as the security threat in real time.

18. The method of using a security threat alarm system of claim 11, wherein said controller transmits additional information received from said smart actuation device to said first responder in real time.

19. The method of using a security threat alarm system of claim 18, wherein said additional information is received from a camera and a microphone.

20. The method of using a security threat alarm system of claim 19, wherein said camera and said microphone utilize artificial intelligence algorithms to identify an assailant and to track said assailant's movement as the security threat continues in real time.

* * * * *